Figure 3:
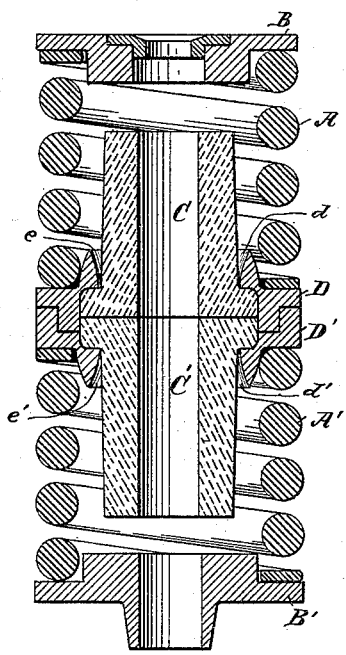

(No Model.)  R. VOSE.  2 Sheets—Sheet 1.
CAR SPRING.
No. 330,445.  Patented Nov. 17, 1885.
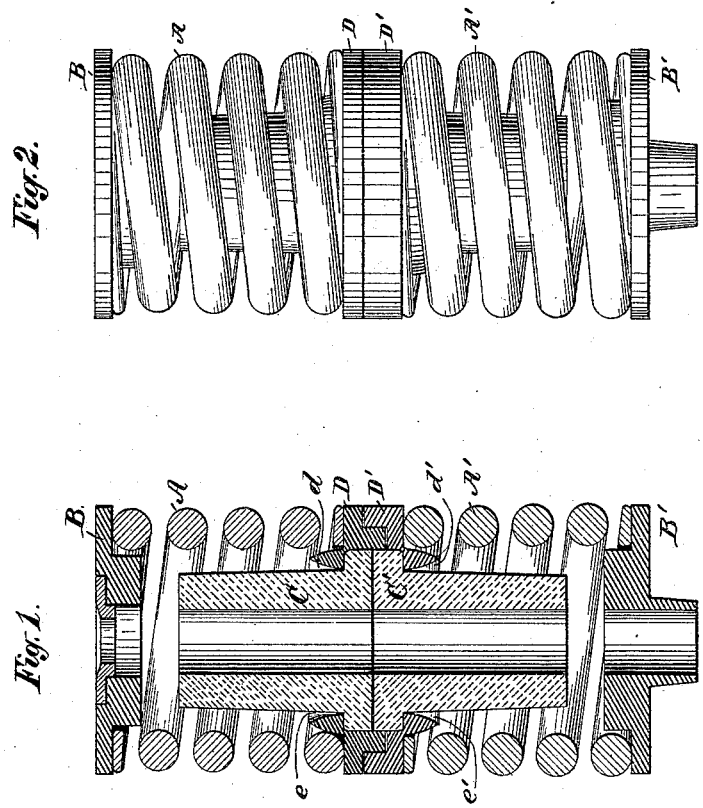
Witnesses:  Inventor (No Model.) 2 Sheets—Sheet 2.

R. VOSE.
CAR SPRING.

No. 330,445. Patented Nov. 17, 1885.

WITNESSES: INVENTOR

UNITED STATES PATENT OFFICE.

RICHARD VOSE, OF NEW YORK, N. Y.

CAR-SPRING.

SPECIFICATION forming part of Letters Patent No. 330,445, dated November 17, 1885.

Application filed May 16, 1885. Serial No. 165,690. (No model.)

*To all whom it may concern:*

Be it known that I, RICHARD VOSE, of the city, county, and State of New York, have invented an Improvement in Car-Springs, of which the following is a specification, reference being had to the drawings accompanying the same, in which—

Figure 1 is a sectional view of a car-spring containing my improvement, and Fig. 2 a side view of the same, and Fig. 3 a like view showing one end of rubber core shorter than the opposite, as hereinafter described.

My improvement consists in the combination of a column of rubber, formed as hereinafter described, the same being composed either of one core of rubber located between two spiral springs, or two cores of rubber placed base to base and held in position inside of and between two spiral coils by means of a holder, as hereinafter described, the cores of rubber being held in such a way between said spirals, that when depressed by use they are not chewed up by the edges of the holders and are auxiliaries.

A and A' are two spiral springs; B, the end caps, placed on the ends of the spirals and constructed in the usual manner, for the purpose of holding the two spirals A and A' together by means of a rod passing through and held in position. C and C' are two rubber cores, either cylindrical or conical in shape, or the two said cores C and C' may be cast in a mold, base to base, and form but one body of rubber. D and D' are the holders, constructed so that each has the rim $d$ and $d'$, which are flanged outward, leaving the space $e'$, as shown. It will thus be seen that if the rubber core is depressed down into its holder, space is left for the bulging of the rubber. It will also be seen that by the use of the core of rubber when the core of rubber is called into action by the partial exhaustion of the steel spiral both cores will be brought simultaneously into action, when both are of equal length, as an auxiliary, by pressure being brought on both ends, and when the rubber is by this pressure bulged there can be no chewing, although the entire spring may be exhausted.

The rubber cores may, for the sake of convenience, as above stated, be cast in one mold and in one piece. The effect in use will be the same when both cores are of equal length.

I do not claim here, broadly, the use of a column of conically-shaped cores of rubber, as the same is secured by Letters Patent granted to me February 5, 1878, being numbered 199,945, as by reference to said Letters Patent the distinction between the invention covered thereby and this application will clearly be seen. The two spirals A and A', arranged exterior of the core of rubber, have their interior ends resting upon the holders, the end of A resting upon holder D, the end of spiral A' resting upon the holder D'. Now, when weight is applied, the action is first upon spiral A, which, pressing upon the holder, presses upon A' and compresses that spiral also. Weight being superadded and the longitude of the spirals A and A' being decreased, the rubber cores, being of equal length, by the pressure upon their ends are brought into action. If a single core is used having its bearings or holder in the center between the two spirals, it will be seen that the same reduction of the longitude of the exterior spiral will bring that single core into action as if two separate cores or two cores formed in one piece were used.

The two cores, as shown in Fig. 3, may be of unequal length, the upper core, or C, being made shorter than the lower core, C', so that the lower core will be brought into action in bearing capacity before the upper core is at all weighed upon. Thus suspended or held between the two coils, the rubber core or center is always ready to act as auxiliary.

The casting D may be cast in two sections and cut through the center, and the bulge of the rubber core placed within the space $h$, the same set into the spiral above and below, the flanges $d$ preventing any displacement of said holders.

What I claim, and desire to secure by Letters Patent, is—

1. In a car-spring, the combination of rubber core or cores formed in one piece, of equal or unequal lengths, with holders D and D', with exterior spiral springs, A and A', substantially as described, and for the purpose specified.

2. In a car-spring, the combination of a rubber core formed by placing two cylindrical or conical cores of rubber base to base, of unequal length, with holders D and D', said holders arranged between the spiral springs A and A', substantially as described, and for the purpose specified.

RICHD. VOSE.

Witnesses:
NATHAN LEVENSON,
JUNIUS SCHENCK.